United States Patent
Li et al.

(10) Patent No.: US 9,077,723 B2
(45) Date of Patent: Jul. 7, 2015

(54) METHOD, MOBILE MANAGEMENT UNIT AND GATEWAY FOR RESTRICTING MTC DEVICE TO ACCESS AND COMMUNICATE

(75) Inventors: Mian Li, Guangdong Province (CN); Fei Lu, Guangdong Province (CN); Chunhui Zhu, Guangdong Province (CN); Shuang Liang, Guangdong Province (CN); Baoguo Xie, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 131 days.

(21) Appl. No.: 13/258,556

(22) PCT Filed: Nov. 4, 2010

(86) PCT No.: PCT/CN2010/078416
§ 371 (c)(1),
(2), (4) Date: Sep. 22, 2011

(87) PCT Pub. No.: WO2011/057541
PCT Pub. Date: May 19, 2011

(65) Prior Publication Data
US 2012/0315874 A1    Dec. 13, 2012

(30) Foreign Application Priority Data

Nov. 10, 2009  (CN) .......................... 2009 1 0210827

(51) Int. Cl.
*H04M 11/04*    (2006.01)
*H04M 11/00*    (2006.01)
(Continued)

(52) U.S. Cl.
CPC .............. *H04L 65/102* (2013.01); *H04W 4/005* (2013.01); *H04W 12/08* (2013.01); *H04W 48/02* (2013.01)

(58) Field of Classification Search
CPC ....... H04W 4/24; H04W 12/06; H04W 12/12; H04M 2215/32; H04M 15/00; H04L 63/08; H04L 47/10; H04L 12/5602; H04Q 11/0478
USPC ........... 455/404.2, 411, 552.1, 408; 370/231, 370/312, 329, 331; 709/229, 250; 710/113; 713/182, 201
See application file for complete search history.

(56) References Cited

U.S. PATENT DOCUMENTS 6,681,260 B1 *  1/2004  Hagi ............................. 709/250
7,054,268 B1 *  5/2006  Parantainen et al. ......... 370/231
(Continued)

FOREIGN PATENT DOCUMENTS

CN     1989737 A     6/2007
CN    100518117 C    7/2009
(Continued)

OTHER PUBLICATIONS

International Search Report for PCT/CN2010/078416 dated Feb. 10, 2011.
(Continued)

*Primary Examiner* — William D Cumming
(74) *Attorney, Agent, or Firm* — Banner & Witcoff, Ltd.

(57) ABSTRACT

A method, a mobility management unit and a gateway unit for restricting access and communication of a machine type communication (MTC) device are provided by the present invention. The method includes: a mobility management unit judging whether an access request or a service request of the MTC device is currently in a permission period according to the permission period of the MTC device; when the access request or the service request is not in the permission period, rejecting the access request or service request of the MTC device and notifying the MTC device of the rejection cause and/or the permission period at a meantime. The present invention can ensure that the MTC device only communicates in the permission period, and the MTC device is restricted to access the network or communicate in the non-permission period according to the requirement of the operator.

6 Claims, 9 Drawing Sheets

(51) Int. Cl.
*H04M 1/66* (2006.01)
*H04M 1/68* (2006.01)
*H04M 3/16* (2006.01)
*H04M 1/00* (2006.01)
*H04L 29/06* (2006.01)
*H04W 48/02* (2009.01)
*H04W 4/00* (2009.01)
*H04W 12/08* (2009.01)

(56) References Cited

U.S. PATENT DOCUMENTS

| | | | |
|---|---|---|---|
| 7,356,703 B2* | 4/2008 | Chebolu et al. | 713/182 |
| 7,974,256 B2 | 7/2011 | Sugaya et al. | |
| 8,041,334 B2* | 10/2011 | Yoon | 455/404.2 |
| 8,081,967 B2 | 12/2011 | Stephens | |
| 8,468,282 B2* | 6/2013 | Awata | 710/113 |
| 8,615,215 B2* | 12/2013 | Speicher | 455/408 |
| 2005/0060580 A1* | 3/2005 | Chebolu et al. | 713/201 |
| 2005/0239455 A1 | 10/2005 | Stephens | |
| 2007/0019607 A1 | 1/2007 | Sugaya et al. | |
| 2008/0162707 A1* | 7/2008 | Beck et al. | 709/229 |
| 2008/0176596 A1* | 7/2008 | Jung et al. | 455/552.1 |
| 2009/0046650 A1* | 2/2009 | Dalsgaard et al. | 370/329 |
| 2009/0253409 A1 | 10/2009 | Slavov et al. | |
| 2009/0323574 A1* | 12/2009 | Koskinen et al. | 370/312 |
| 2010/0162370 A1* | 6/2010 | Altay et al. | 726/5 |
| 2010/0260115 A1* | 10/2010 | Frederiksen et al. | 370/329 |
| 2011/0145456 A1* | 6/2011 | Awata | 710/113 |
| 2012/0315874 A1* | 12/2012 | Li et al. | 455/411 |
| 2013/0142169 A1* | 6/2013 | Kulakov et al. | 370/331 |

FOREIGN PATENT DOCUMENTS

| | | |
|---|---|---|
| JP | 2004-364203 A | 12/2004 |
| JP | 2004364203 A | 12/2004 |

OTHER PUBLICATIONS

International Preliminary Report on Patentability and Written Opinion mailed May 15, 2012, PCT/CN2010/078416, English translation.

\* cited by examiner

METHOD, MOBILE MANAGEMENT UNIT AND GATEWAY FOR RESTRICTING MTC DEVICE TO ACCESS AND COMMUNICATE

TECHNICAL FIELD

The present invention relates to the field of mobile communication, and in particular, to a method for restricting access and communication of a machine type communication (MTC) device, a mobility management unit and a gateway unit.

BACKGROUND OF THE RELATED ART

With the sudden rise of world interoperability for microwave access (WiMax) technology, in order to keep its competitiveness in the field of mobile communication, the 3rd generation mobile communication system must improve its network performance and reduce network construction and operation cost. Therefore, the standardized work group of the 3rd generation partnership project (3GPP) is currently studying the evolution of the packet switch core (PS core) network and the universal mobile telecommunication system radio access network (UTRAN). That research subject is called as the system architecture evolution (SAE), and the object is to enable the evolved packet core (EPC) network to provide a higher transmission rate and a shorter transmission delay time, to optimize grouping, and to support the mobility management among the Evolved UTRAN (E-UTRAN), UTRAN, the wireless local area network (WLAN) and other non-3GPP access networks.

The current framework of the SAE is shown in FIG. 1, wherein the network elements included in the evolved universal terrestrial radio access network (E-UTRAN) is an evolved NodeB (eNodeB) used for providing the radio resource to the user access; the packet data network (PDN) is a network providing the service to the user; the EPC provides a lower delay, and allows the access of more wireless access systems, which includes the following network elements:

The mobility management entity (MME) is a control plane function entity, is a server storing the user data temporarily, and is responsible for managing and storing the context (such as: the user identifier, the mobility management state, and the user security parameter, etc.) of the user equipment (UE); allocates a temporary identifier for the user; when the UE resides in the tracking area or this network, MME is responsible for authenticating this user; processes all messages of the non-stratum layer between the MME and the UE; and triggers the paging in the SAE. The MME is the mobility management entity of the SAE system, and in the universal mobile telecommunication system (UMTS), the mobility management entity is a serving general packet radio service (GPRS) support node (SGSN).

The serving gateway (SGW) is one user plane entity and is responsible for the data routing processing of the user plane, terminating the downlink data of the UE in the idle (ECM_IDLE) state, and managing and storing the SAE bearer context of the UE, such as the IP bearer service parameter and the routing information within the network, etc. The SGW is the anchor point of the user plane within the 3GPP system, and one user only can have one SGW at one moment.

The PDN Gateway (PGW) is a gateway which is responsible for the UE accessing the PDN and for allocating the user IP addresses, and the PGW also is the mobility anchor point of the 3GPP and the non-3GPP access systems. The function of the PGW also includes policy implementation, and charging support. The user can access a plurality of PGWs at the same moment. The policy and charging enforcement function (PCEF) also resides in the PGW.

The policy and charging rules function (PCRF) is responsible for providing the policy control and the charging rules to the PCEF.

The home subscriber server (HSS) is responsible for permanently storing the user subscribed data, and the content stored by the HSS includes the international mobile subscriber identification (IMSI) of the UE and the IP address of the PGW.

Physically, the SGW and the PGW may be combined, and the EPC system user plane network elements include the SGW and the PGW.

The narrow definition of the M2M is the machine to machine communication. The general definition is the networked application and service which takes the intelligent interaction of the machine terminal as the core. It is based on the intelligent machine terminal, takes a plurality of communication modes as the access means, provides the informatization solution for the customer, and is used for meeting the informatization demands of the customer in the respects, such as monitoring, command and scheduling, data acquisition and measuring, etc.

The development of the wireless technology is the important factor of the development of the M2M market, which breaks the space-time restriction and the region obstacle of the traditional communication mode, makes the enterprise and the public get rid of the constraint of the cable, lets the customer control the cost more effectively and reduce the mounting cost, and facilitates the use. In addition, the increasing demand promotes the continuous development of the M2M, but the contradiction with the constant increasing of the information processing capability and the network bandwidth is that the information acquisition means far fall behind. While the M2M meets this demand of people very well, and people can monitor the external environment in real time through it, realize the large range and automatic information acquisition. Therefore, the M2M can be applied in the industry application, the family application and the personal application, etc. The industry application includes: traffic monitoring, the alarm system, marine rescuing, the dispenser, and driving payment etc. The family application includes: automatic meter reading and temperature control, etc. The personal application includes: life detection and remote diagnoses etc.

The communication object of the M2M is machine to machine or people to machine. The data communication among one or more machines is defined as the MTC, and in this case, it seldom needs the man-machine interaction. The machine participating in the MTC is defined as the MTC equipment. The MTC equipment is the terminal of the MTC user, which can communicate with the MTC equipment and the MTC server through the public land mobile network (PLMN). The mobile equipment (ME) is the additional function block of the MTC equipment, and that function block is used for the MTC equipment accessing the EPS system. The MTC server manages and monitors the MTC equipment. FIG. 2 is a schematic diagram of an ME accessing the EUTRAN through an EPS in the related art.

Since the MTC equipments are mostly specific application equipment, for example, the automatic meter reading and life detection use different equipments, etc. The MTC equipments of different applications have different characteristics, for example, the elevator equipment such as the lift etc. has low mobility and the packet switch only (PS only) attribute. While the monitoring and alarm equipment, besides having low mobility and the PS only characteristics, also has the attributes, such as low data transmission and high usability. Therefore, performing different system optimizations to the MTC equipment of different applications can perform management, controlling and payment, etc., to the MTC equipment.

One kind of MTC application communication is controlled by time, that is, it allows the MTC device accessing the network or performing the data sending and receiving in a plurality of particular periods, and it should restrict the MTC device from performing the above-mentioned operations beyond the permission period. In the current LTE network, when the UE needs to register in the network, or initiate a location update, or initiate a service request, the MME performs the access control to it, and then the S-GW and the P-GW are responsible for the user data transmission, however, in the related art, the MME, the S-GW and the P-GW do not adopt the mechanism to control the UE to allow accessing the network and performing communication only in the particular period. While the introduction of the M2M communication, especially the particularity of the MTC device (such as low data amount, the MTC device without the human being operation), requires that the MTC device should access the network for communication in a plurality of particular periods. The current LTE network cannot meet such a demand.

SUMMARY OF THE INVENTION

The present invention provides a method, a mobility management unit and a gateway unit for restricting access and communication of a MTC device, to meet the particular application of the MTC device.

In order to solve the existing technical problem, the present invention provides a method for restricting access and communication of a machine type communication (MTC) device, comprising: a mobility management unit judging whether an access request or a service request of a MTC device is currently in a permission period according to the permission period of the MTC device; when judging that the access request or the service request is not in the permission period, rejecting the access request or the service request of the MTC device and notifying the MTC device of a rejection cause and/or the permission period at a meantime.

The above method further comprises: the mobility management unit obtaining the permission period from a subscriber server when the MTC device performs an Attach procedure, a tracking area update procedure or a routing area update procedure.

The mobility management unit obtains the permission period from the subscriber server through one of following messages: a location update response message and an insertion subscription data message.

The subscriber server is a home subscriber server (HSS) or a home location register (HLR).

The access request refers to: an Attach request, a tracking area update request, a packet data protocol (PDP) context activation request or a routing area update request.

The above method further comprises: the mobility management unit releasing an air interface of the MTC device in a non-permission period according to the permission period, and notifying a serving gateway and an evolved node B of a release cause value and/or the permission period, or, notifying a gateway general packet radio service (GPRS) support node and a radio network controller; and/or, the mobility management unit performing detachment and deleting a session of the MTC device in the non-permission period according to the permission period, notifying the serving gateway and a packet data network gateway and the MTC device of the session deletion cause value and/or the permission period, or notifying the gateway GPRS support node and the MTC device.

The mobility management unit is a mobility management entity or a serving GPRS support node.

The present invention further provides a method for restricting access and communication of a machine type communication (MTC) device, comprising:

a gateway unit obtaining a permission period of a MTC device from a mobility management unit; and the gateway unit judging whether data transmission of the MTC device is currently in the permission period according to the obtained permission period; when judging that the data transmission is not in the permission period, rejecting the data transmission of the MTC device.

The above method further comprises: the mobility management unit obtaining the permission period of the MTC device from a subscriber server when the MTC device performs an Attach procedure, a tracking area update procedure or a routing area update procedure; and the gateway unit sending a rejection cause value to the mobility management unit when rejecting the data transmission of the MTC device. The gateway unit can be a gateway general packet radio service (GPRS) support node, and the gateway GPRS support node can obtain the permission period from the mobility management unit through a packet data protocol (PDP) context establishment request message or a PDP context update request message when the MTC device performs a PDP context activation procedure or a routing area update procedure; or, the gateway unit can be a serving gateway or a packet data network gateway, and the serving gateway or the packet data network gateway can obtain the permission period from the mobility management unit through a session establishment request message or a bearer modification request message when the MTC device performs an Attach procedure or a tracking area update procedure.

The present invention further provides a mobility management unit for restricting access and communication of a machine type communication (MTC) device, configured to: judge whether an access request or a service request of a MTC device is currently in a permission period according to the permission period of the MTC device; when judging that the access request or the service request is not in the permission period, reject the access request or the service request of the MTC device and notify the MTC device of a rejection cause and/or the permission period.

The above mobility management unit further can be configured to: obtain the permission period of the MTC device from a subscriber server when the MTC device performs an Attach procedure, a tracking area update procedure or a routing area update procedure.

The access request refers to: an Attach request, a tracking area update request, a packet data protocol (PDP) context activation request or a routing area update request.

The above mobility management unit further can be configured to: release an air interface of the MTC device in a non-permission period according to the permission period, and notify a serving gateway and an evolved node B of a release cause value and/or the permission period, or, notify a gateway general packet radio service (GPRS) support node and a radio network controller; and/or, perform detachment and delete a session of the MTC device in the non-permission period according to the permission period, and notify the serving gateway and a packet data network gateway and the MTC device of the session deletion cause value and/or the permission period, or notify the gateway GPRS support node and the MTC device.

The above mobility management unit can be a mobility management entity or a serving gateway general packet radio service (GPRS) support node.

The present invention further provides a gateway unit for restricting access and communication of a machine type communication (MTC) device, configured to: obtain a permission period of a MTC device from a mobility management unit; and judge whether data transmission of the MTC device is currently in the permission period according to the obtained permission period; when the data transmission is not in the permission period, reject the data transmission of the MTC device.

The mobility management unit can obtain the permission period of the MTC device from a subscriber server when the MTC device performs an Attach procedure, a tracking area update procedure or a routing area update procedure; and the gateway unit further can be configured to send a rejection cause value to the mobility management unit when rejecting the data transmission of the MTC device.

The gateway unit can be a gateway general packet radio service (GPRS) support node, and the gateway GPRS support node can be configured to obtain the permission period from the mobility management unit through a packet data protocol (PDP) context establishment request message or a PDP context update request message when the MTC device performs a PDP context activation procedure or a routing area update procedure; or, the gateway unit is a serving gateway or a packet data network gateway, and the serving gateway or the packet data network gateway is configured to obtain the permission period from the mobility management unit through a session establishment request message or a bearer modification request message when the MTC device performs an Attach procedure or a tracking area update procedure.

The present invention provides a method, a mobility management unit and gateway unit for restricting a MTC device accessing the network and communicating in a non-permission period, which can ensure that the MTC device only communicate in the permission period and restrict it accessing the network and communicating in the non-permission period according to the requirement of the operator.

PREFERRED EMBODIMENTS OF THE PRESENT INVENTION

Figure 1:
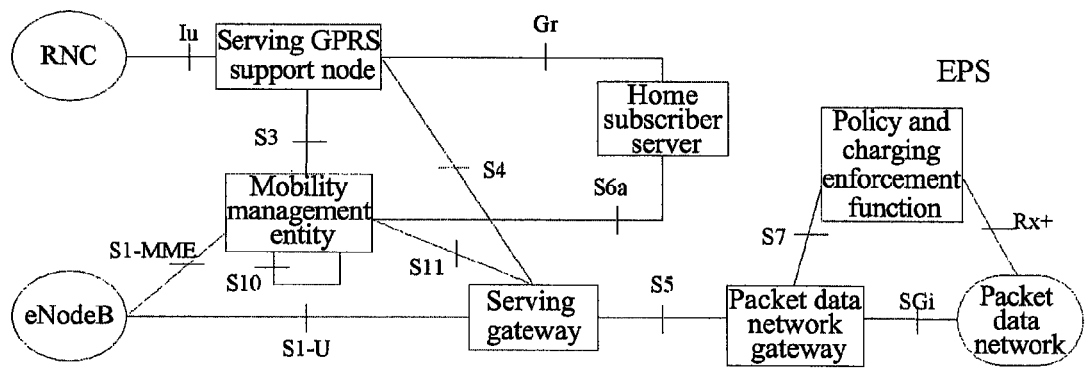
FIG. 1 is a schematic diagram of a framework of an EPC system and an access network in the related art.
Figure 2:
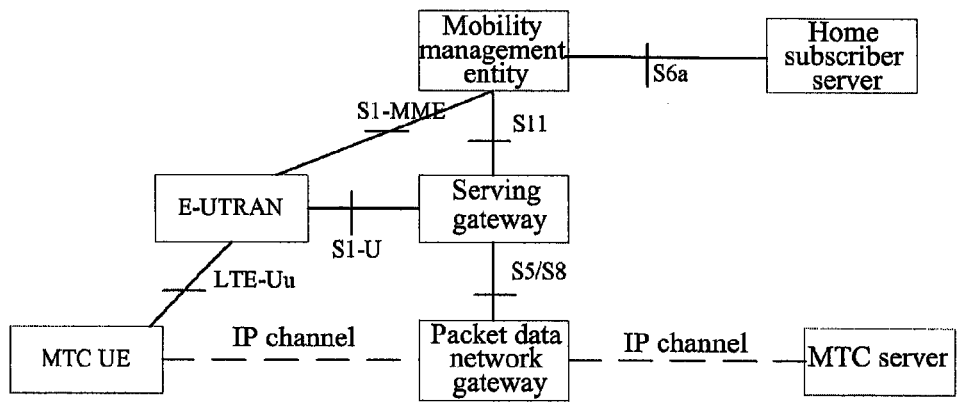
FIG. 2 is a schematic diagram of an MTC UE accessing an EPC system through the EUTRAN in the related art.

The technical scheme of the present invention is described in detail with reference to the accompanying drawings and in combination with embodiments hereinafter, so as to enable those skilled in the art to understand the present invention more clearly and implement the present invention, however, the illustrated embodiment is not intended to limit the present invention.

The method for restricting access and communication of a MTC device provided by the present invention comprises: a mobility management unit judging whether an access request or a service request of the MTC device is currently in a permission period according to the permission period of the MTC device; when the access request or the service request of the MTC device is currently not in the permission period, rejecting the access request or the service request of the MTC device and notifying the MTC device of a rejection cause and/or the permission period.

In the E-UTRAN, the access request is an Attach request or a tracking area update request; in the UTRAN, the access request is an Attach request, a PDP context activation request or a routing area update request.

Furthermore, the mobility management unit obtains the permission period of the MTC device from a subscriber server through a location update response message or an insertion subscription data message when the MTC device performs an Attach procedure, a tracking area update procedure or a routing area update procedure.

Furthermore, the mobility management unit can reject the Attach request of the MTC UE according to the obtained permission period and notifies the MTC UE of the rejection cause and/or the permission period.

Furthermore, the mobility management unit can reject the tracking area update request of the MTC UE according to the obtained permission period and notifies the MTC UE of the rejection cause and/or the permission period.

Furthermore, the mobility management unit can reject the service request of the MTC UE according to the obtained permission period and informs the MTC UE of the rejection cause and/or the permission period.

Furthermore, the mobility management unit can reject the PDP context activation request of the MTC UE according to the obtained permission period and notifies the MTC UE of the rejection cause and/or the permission period.

Furthermore, the mobility management unit can reject the routing area update request of the MTC UE according to the obtained permission period and notifies the MTC UE of the rejection cause and/or the permission period.

Furthermore, the mobility management unit releases an air interface of the MTC device in a non-permission period according to the permission period, notifies a S-GW and an eNodeB of a release cause value and/or the permission period, or, notifies a GGSN and a radio network controller (RNC); specifically, in the E_UTRAN network, S1 is released, which releases the S1-U bearer of the MTC device and notifies the S-GW and the eNodeB of the release cause; in the UTRAN network, then the mobility management unit releases the Iu in the non-permission period and notifies the GGSN and the RNC of the release cause.

Furthermore, the mobility management unit can perform detachment of the MTC UE and delete the session of the MTC UE in the non-permission period according to the obtained permission period, and notify the S-GW and the P-GW of the session deletion cause value and/or the permission period, or notify the GGSN and optionally notify the MTC UE of the detachment cause value in the detachment message.

Furthermore, the mobility management unit is a mobility management entity (MME) or a serving GPRS support node (SGSN).

Furthermore, the subscriber server is a home subscriber server (HSS) or a home location register (HLR).

In addition, the present invention further provides a method for restricting access and communication of a MTC device, and the method comprises: a gateway unit obtaining a permission period of the MTC device from a mobility management unit; and judging whether data transmission of the MTC device is currently in the permission period according to the obtained permission period; when judging that data transmission of the MTC device is currently not in the permission period, rejecting the uplink or downlink data transmission of the MTC device, wherein the mobility management unit can obtain the permission period of the MTC device from a subscriber server when the MTC device performs an Attach procedure, a tracking area update procedure or a routing area update procedure; and the gateway unit can also send a rejection cause value to the mobility management unit when rejecting the uplink or downlink data transmission of the MTC device.

The subscriber server can be the HSS or the HLR.

Furthermore, when the gateway unit is the S-GW or the P-GW, the permission period can be sent to the S-GW or the P-GW by a session establishment request message or a bearer modification request message by the mobility management unit when the MTC device performs the Attach procedure or the tracking area update procedure.

Furthermore, when the gateway unit is the GGSN, the permission period can be sent to the GGSN by a PDP context establishment request message or a PDP context update request message by the mobility management unit when the MTC device performs the PDP context activation procedure or a routing area update procedure; furthermore, the gateway unit can reject the uplink data transmission according to the obtained permission period and send a message including the rejection cause value to notify the mobility management unit; furthermore, the gateway unit can reject the downlink data transmission according to the obtained permission period and send a message including the rejection cause value to notify the mobility management unit.

Furthermore, the gateway unit is an S-GW or a P-GW, or a GGSN.

The present invention further provides a mobility management unit for restricting access and communication of a MTC device, configured to: judge whether an access request or a service request of the MTC device is currently in a permission period according to the permission period of the MTC device; when judging that the access request or the service request of the MTC device is currently not in the permission period, reject the access request or the service request of the MTC device. The mobility management unit is further configured to: obtain the permission period of the MTC device from a subscriber server when the MTC device performs an Attach procedure, a tracking area update procedure or a routing area update procedure. Further, the mobility management unit can obtain the permission period from the subscriber server through one of following messages: a location update response message and an insertion subscription data message.

The mobility management unit is further configured to notify the MTC device of the rejection cause and/or the permission period when rejecting the access request or the service request of the MTC device.

The access request refers to: the Attach request, the tracking area update request, the PDP context activation request or the routing area update request.

The mobility management unit is further configured to:
release an air interface of the MTC device in a non-permission period according to the permission period, and notify a serving gateway and an evolved node B of a release cause value and/or the permission period, or, notify a gateway GPRS support node and a radio network controller; and/or, perform detachment of the MTC device and delete a session of the MTC device in the non-permission period, notify the serving gateway and a packet data network gateway and the MTC device of the session deletion cause value and/or the permission period, or notify the gateway GPRS support node and the MTC device.

The mobility management unit is a mobility management entity or a serving GPRS support node.

The subscriber server can be the HSS or the HLR.

The present invention further provides a gateway unit for restricting access and communication of a MTC device, configured to: obtain a permission period of the MTC device from a mobility management unit; and judge whether data transmission of the MTC device is currently in the permission period according to the obtained permission period; when judging that the data transmission of the MTC device is not in the permission period, reject the data transmission of the MTC device. The permission period obtained from the mobility management unit by the gateway unit is obtained from the subscriber server by the mobility management unit when the MTC device performs the Attach procedure, the tracking area update procedure or the routing area update procedure.

The gateway unit is a gateway GPRS support node, and the gateway GPRS support node is configured to obtain the permission period from the mobility management unit through a PDP context establishment request message or a PDP context update request message when the MTC device performs the PDP context activation procedure or a routing area update procedure; or, the gateway unit is a serving gateway or a packet data network gateway, and the serving gateway or the packet data network gateway is configured to obtain the permission period from the mobility management unit through a session establishment request message or a bearer modification request message when the MTC device performs the Attach procedure or the tracking area update procedure.

The gateway unit is further configured to send a rejection cause value to the mobility management unit when rejecting the uplink or downlink data transmission of the MTC device.

The subscriber server can be the HSS or the HLR.

Embodiment 1

Embodiment 1 relates to a procedure of the MME obtaining the permission period of the MTC UE during the Attach.

The permission period of the present invention is the predefined period aiming at the MTC device, and the MTC device is only allowed to access the network or perform the data transmissions within that period.

Figure 3:
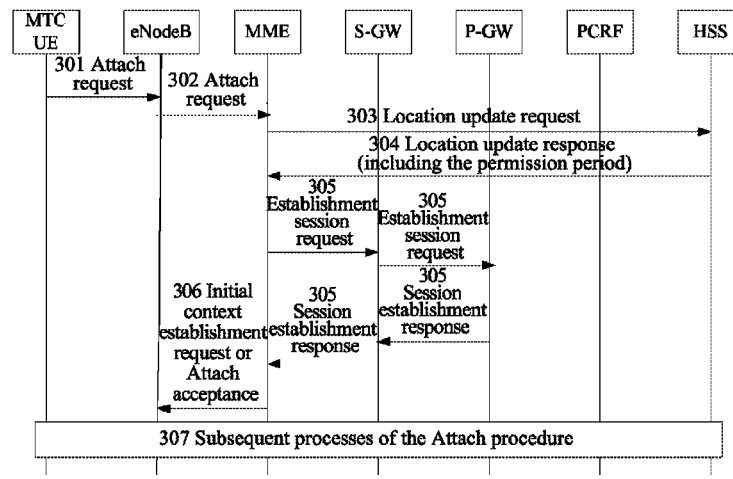
FIG. 3 is a flow chart of an MME obtaining a permission period of an MTC UE during Attach according to embodiment 1 of the present invention.

FIG. 3 is the flow chart of the method described by the present invention, comprising the following steps.

In step 301, the MTC UE initiates the Attach request message to the eNodeB. When the UE has a GUTI, it needs to include the GUTI; when the UE does not have a GUTI, it needs to include the IMSI.

In step 302, the eNodeB derives to obtain the MME attached by the UE before according to the GUTI; if the MME is unable to be derived directly, it can select one new MME through a "MME selection function", and forwards the Attach message to the new MME.

In step 303, if the MME changes or performs Attach at the first time, the MME will send the location update request message to the HSS.

In step 304, the HSS sends the location update response message including the predefined permission period to the MME, and the MME stores the above-mentioned permission period.

In step 305, the session bearer establishment among the MME, the S-GW and the P-GW is performed.

In step 306, the MME sends the initial context establishment request to the eNodeB.

In step 307, the subsequent procedure of the Attach procedure is completed.

It needs to be pointed out that the present embodiment is also suited for the case that the MTC UE accesses the SGSN.

Embodiment 2

Figure 4:
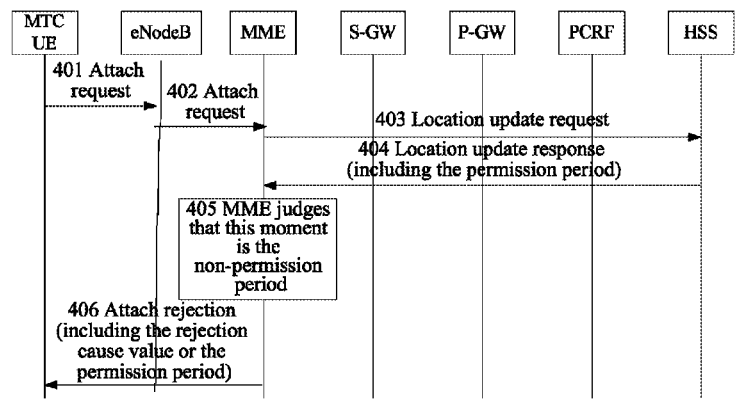
FIG. 4 is a flow chart of an MME obtaining a permission period and judging and rejecting Attach according to the obtained permission period according to embodiment 2 of the present invention.

Embodiment 2 is a procedure of the MME judging and rejecting the Attach according to the obtained permission period. FIG. 4 is the flow chart of the method described by the present invention, comprising the following step.

In step 401, the MTC UE initiates the Attach request message to the eNodeB. When the UE has a GUTI, it needs to include the GUTI; when the UE does not have a GUTI, it needs to include the IMSI.

In step 402, the eNodeB derives to obtain the MME attached by the UE before according to the GUTI; if the MME is unable to be derived directly, one new MME can be selected through a "MME selection function", and the Attach message is forwarded to the new MME.

In step 403, if the MME has already stored the permission period information of the MTC UE, then the MME performs judgment according to that permission period, and sends an Attach rejection message in the non-permission period. The Attach rejection message can include the rejection cause value, which is used for representing that the rejection cause is that the access of the MTC UE is in a non-permission period. The Attach rejection message also can include the predefined permission period. The Attach rejection message also can include the rejection cause value and the predefined permission period at the same time; if the MME changes or is attached at the first time, the MME will send the location update request message to the HSS.

In step 404, the HSS sends the location update response message including the predefined permission period to the MME, and the MME stores the above-mentioned permission period.

In step 405, the MME judges that this moment is a non-permission period according to the predefined permission period.

In step 406, the MME sends the Attach rejection message to the MTC UE. The message can include the rejection cause value, which is used for representing that the rejection cause is that the access of the MTC UE is in a non-permission period. The Attach rejection message also can include the predefined permission period. The Attach rejection message also can include the rejection cause value and the predefined permission period at the same time.

It needs to be pointed out that the present embodiment is also suited for the case that the MTC UE accesses the SGSN.

Embodiment 3

Figure 5:
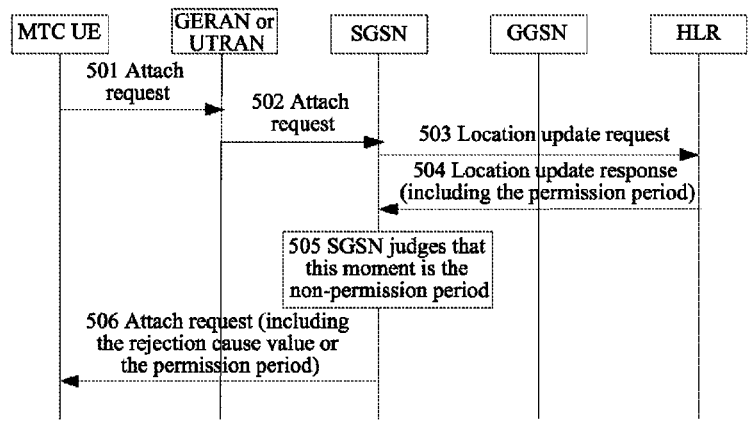
FIG. 5 is a flow chart of an SGSN obtaining a permission period and judging and rejecting Attach according to the obtained permission period according to embodiment 3 of the present invention.

Embodiment 3 is a procedure of the SGSN obtaining the permission period and judging and rejecting the Attach according to the obtained permission period. FIG. 5 is the flow chart of the method described by the present invention, and the method comprises following steps.

In step 501, the MTC UE initiates the Attach request message to the GERAN or the UTRAN.

In step 502, the GERAN or the UTRAN selects one SGSN for the MTC UE and forwards the Attach request message to that SGSN.

In step 503, if the SGSN has already stored the permission period information of the MTC UE, then the SGSN performs judgment according to that permission period, and sends an Attach rejection message in the non-permission period. The message can include the rejection cause value, which is used for representing that the rejection cause is that the access of the MTC UE is in the non-permission period. The message also can include the predefined permission period. The message also can include the rejection cause value and the predefined permission period at the same time; if the SGSN changes or is attached at the first time, the SGSN will send the location update request message to the HLR.

In step 504, the HLR sends the location update response message including the predefined permission period to the SGSN, and the SGSN stores the above-mentioned permission period.

In step 505, the SGSN judges that this moment is a non-permission period according to the predefined permission period.

In step 506, the SGSN sends the Attach rejection message to the MTC UE. The message can include the rejection cause value, which is used for representing that the rejection cause is that the access of the MTC UE is in the non-permission period. The message also can include the predefined permission period. The message also can include the rejection cause value and the predefined permission period at the same time.

Embodiment 4

Figure 6:
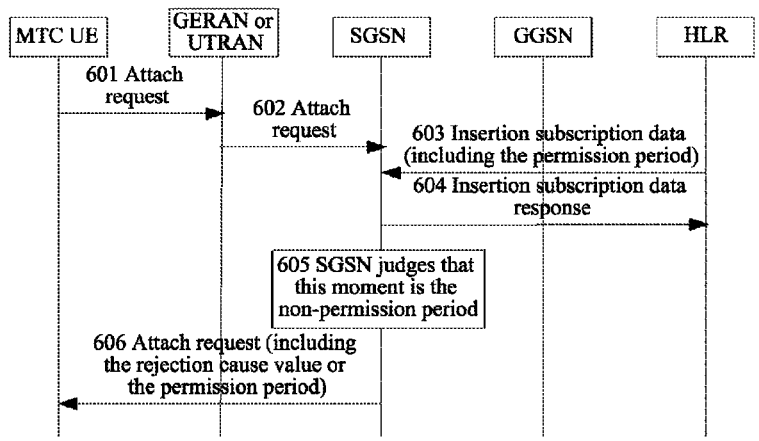
FIG. 6 is a flow chart of an SGSN obtaining a permission period and judging and rejecting Attach according to the obtained permission period according to embodiment 4 of the present invention.

Embodiment 4 is the procedure of the SGSN obtaining the permission period and judging and rejecting the Attach according to the obtained permission period. FIG. 6 is the flow chart of the method described by the present invention, and the method comprises the following steps.

In step 601, the MTC UE initiates the Attach request message to the GERAN or the UTRAN.

In step 602, the GERAN or the UTRAN selects one SGSN for the MTC UE and forwards the Attach request message to that SGSN.

In step 603, if the SGSN has already stored the permission period information of the MTC UE, then the SGSN performs judgment according to that permission period, and sends an Attach rejection message in the non-permission period. The message can include the rejection cause value, which is used for representing that the rejection cause is that the access of the MTC UE is in the non-permission period. The message also can include the predefined permission period. The message also can include the rejection cause value and the predefined permission period at the same time; if the SGSN changes or is attached at the first time, the SGSN will send the location update request message to the HLR; and the HLR includes the predefined permission period in the insertion subscription data message and the SGSN stores the above-mentioned permission period.

In step 604, the SGSN sends the insertion subscription data response message to the HLR.

In step 605, the SGSN judges that this moment is a non-permission period according to the predefined permission period.

In step 606, the SGSN sends the Attach rejection message to the MTC UE. The message can include the rejection cause value, which is used for representing that the rejection cause is that the access of the MTC UE is in the non-permission period. The message also can include the predefined permission period. The message also can include the rejection cause value and the predefined permission period at the same time.

Embodiment 5

Figure 7:
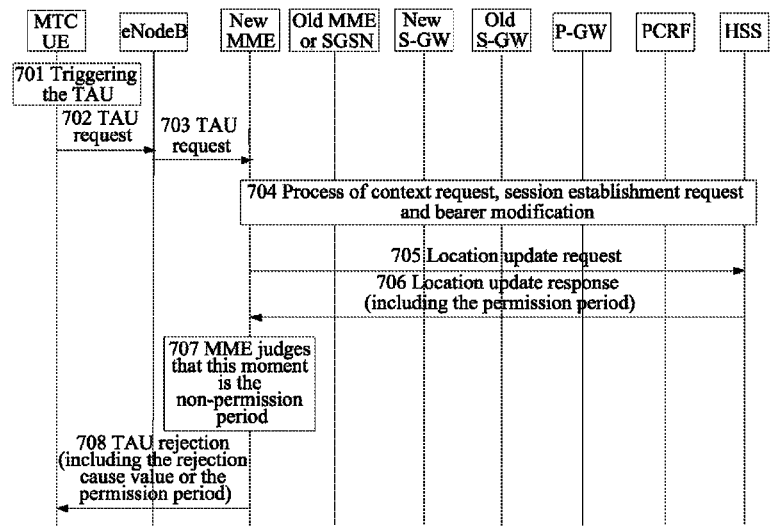
FIG. 7 is a flow chart of an MME obtaining a permission period and judging and rejecting a tracking area update according to the obtained permission period according to embodiment 5 of the present invention.

Embodiment 5 is the procedure of the MME performing judgment according to the obtain permission period and rejecting the tracking area update. FIG. 7 is the flow chart of the method described by the present invention, and the method comprises the following steps.

In step 701, the MTC UE meets the TAU triggering condition, and triggers the tracking area update procedure.

In step 702, the MTC UE sends a TAU request message including a selection network indication to the eNodeB.

In step 703, the eNodeB derives to obtain the MME attached by the UE before; if the MME is unable to be derived directly, one new MME can be selected through a "MME selection function", and the TAU message is forwarded to the new MME.

In step 704, if the MME has already stored the permission period information of the MTC UE, then the MME performs judgment according to that permission period, and sends the tracking area update rejection message in the non-permission period. The message can include the rejection cause value, which is used for representing that the rejection cause is the MTC UE performing the TAU in a non-permission period. The message also can include the predefined permission period. The message also can include the rejection cause value and the predefined permission period at the same time; if not, then the context request process between the new MME and the old MME or the SGSN, and the session establishment process and the bearer modification process among the new MME and the S-GW and the P-GW are performed.

In step 705, the new MME sends the location update request message to the HSS.

In step 706, the HSS sends the location update response message including the predefined permission period to the MME, and the MME stores the above-mentioned permission period.

In step 707, the MME judges that this moment is a non-permission period according to the predefined permission period.

In step 708, the MME sends the tracking area update rejection message to the MTC UE. The message can include the rejection cause value, which is used for representing that the rejection cause is the MTC UE performing the TAU in a non-permission period. The message also can include the predefined permission period. The message also can include the rejection cause value and the predefined permission period at the same time.

It needs to be pointed out that the present embodiment is also suited for the case that the MTC UE accesses the SGSN.

Embodiment 6

Figure 8:
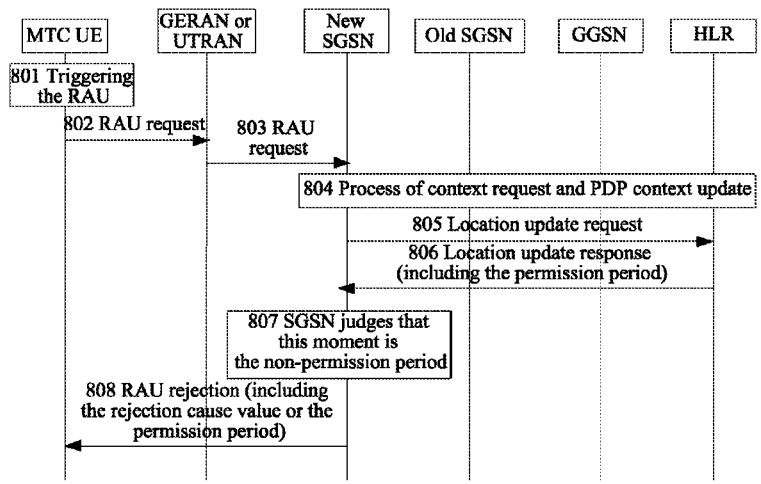
FIG. 8 is a flow chart of an SGSN obtaining a permission period and judging and rejecting routing area update according to the obtained permission period according to embodiment 6 of the present invention.

Embodiment 6 is the procedure of the SGSN performing judgment according to the obtain permission period and rejecting the tracking area update. FIG. 8 is the flow chart of the method described by the present invention, and the method comprises the following steps.

In step 801, the MTC UE meets the RAU triggering condition, and triggers the routing area update procedure.

In step 802, the MTC UE initiates a RAU request message to the GERAN or the UTRAN.

In step 803, the GERAN or the UTRAN selects one SGSN for the MTC UE and forwards the RAU message to that SGSN.

In step 804, if the SGSN has already stored the permission period information of the MTC UE, then the SGSN performs judgment according to that permission period, and sends the routing area update rejection message in the non-permission period. The message can include the rejection cause value, which is used for representing that the rejection cause is the MTC UE performing the RAU in a non-permission period. The message also can include the predefined permission period. The message also can include the rejection cause value and the predefined permission period at the same time; if not, then the context request process between the new SGSN and old SGSN and the PDP context update process between the new SGSN and the GGSN are performed.

In step 805, the new SGSN sends the location update request message to the HLR.

In step 806, the HLR sends the location update response message including the predefined permission period to the SGSN, and the SGSN stores the above-mentioned permission period.

In step 807, the SGSN judges that this moment is a non-permission period according to the predefined permission period.

In step 808, the SGSN sends the routing area update rejection message to the MTC UE. The message can include the rejection cause value, which is used for representing that the rejection cause is the MTC UE performing the RAU in a non-permission period. The message also can include the predefined permission period. The message also can include the rejection cause value and the predefined permission period at the same time.

Embodiment 7

Figure 9:
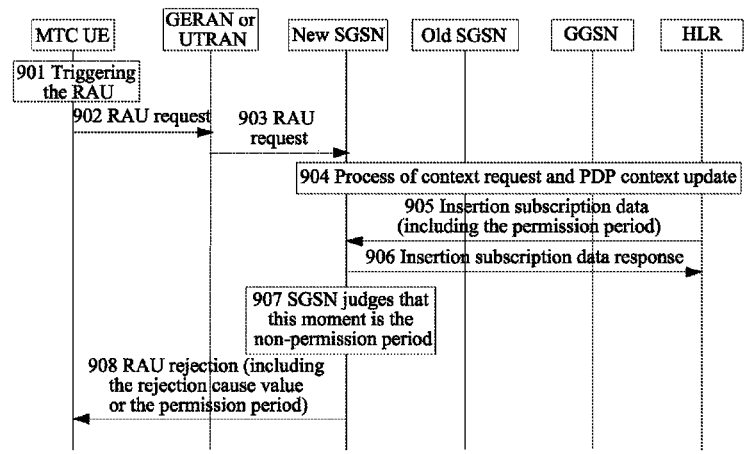
FIG. 9 is a flow chart of an SGSN obtaining a permission period and judging and rejecting routing area update according to the obtained permission period according to embodiment 7 of the present invention.

Embodiment 7 is the procedure of the SGSN performing judgment according to the obtained permission period and rejecting the tracking area update. FIG. 9 is the flow chart of the method described by the present invention, and the method comprises the following steps.

In step 901, the MTC UE meets the RAU triggering condition, and triggers the routing area update procedure.

In step 902, the MTC UE initiates a RAU request message to the GERAN or the UTRAN.

In step 903, the GERAN or the UTRAN selects one SGSN for the MTC UE and forwards the Attach request message to that SGSN.

In step 904, if the SGSN has already stored the permission period information of the MTC UE, then the SGSN performs judgment according to that permission period, and sends the routing area update rejection message in the non-permission period. The message can include the rejection cause value, which is used for representing that the rejection cause is the MTC UE performing the RAU in a non-permission period. The message also can include the predefined permission period. The message also can include the rejection cause value and the predefined permission period at the same time; if not, then the context request process between the new SGSN and old SGSN and the context update process between the new SGSN and the GGSN are performed.

In step 905, the new SGSN sends the location update request message to the HLR, and the HLR sends the insertion subscription data message including the predefined permission period to the SGSN, and the SGSN stores the above-mentioned permission period.

In step 906, the SGSN sends the insertion subscription date response message to the HLR.

In step 907, the SGSN judges that this moment is a non-permission period according to the predefined permission period.

In step 908, the SGSN sends the routing area update rejection message to the MTC UE. The message can include the rejection cause value, which is used for representing that the rejection cause is the MTC UE performing the RAU in a non-permission period. The message also can include the predefined permission period. The message also can include the rejection cause value and the predefined permission period at the same time.

Embodiment 8

Figure 10:
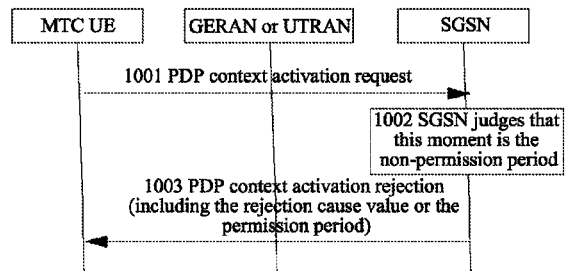
FIG. 10 is a flow chart of an SGSN judging and rejecting PDP context activation according to the obtained permission period according to embodiment 8 of the present invention.

Embodiment 8 is the procedure of the SGSN performing judgment according to the obtained permission period and rejecting the PDP context activation request. FIG. 10 is the flow chart of the method described by the present invention, and the method comprises the following steps.

In step 1001, the MTC UE sends the PDP context activation request message to the GERAN or the UTRAN, and the GERAN or the UTRAN forwards the message to the SGSN.

In step 1002, the SGSN judges that this moment is a non-permission period according to the predefined permission period obtained when the MTC UE is attached before.

In step 1003, the SGSN sends the PDP context activation rejection message to the MTC UE. The message can include the rejection cause value, which is used for representing that the rejection cause is the MTC UE performing the service request in a non-permission period. The message also can include the predefined permission period. The message also can include the rejection cause value and the predefined permission period at the same time.

Embodiment 9

Figure 11:
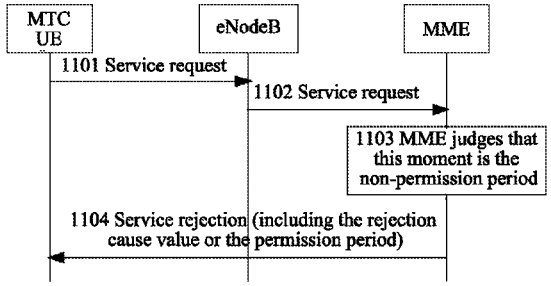
FIG. 11 is a flow chart of an MME judging and rejecting a service request according to the obtained permission period according to embodiment 9 of the present invention.

Embodiment 9 is the procedure of the MME performing judgment according to the obtained permission period and rejecting the service request. FIG. 11 is the flow chart of the method described by the present invention, and the method comprises the following steps.

In step 1101, the MTC UE sends the service request message to the eNodeB.

In step 1102, the eNodeB forwards the service request message to the MME.

In step 1103, the MME judges that this moment is a non-permission period according to the predefined permission period obtained when the MTC UE is attached before.

In step 1104, the MME sends the service rejection message to the MTC UE. The message can include the rejection cause value, which is used for representing that the rejection cause is the MTC UE performing the service request in a non-permission period. The message also can include the predefined permission period. The message also can include the rejection cause value and the predefined permission period at the same time.

It needs to be pointed out that the present embodiment is also suited for the case that the MTC UE accesses the SGSN.

Embodiment 10

Figure 12:
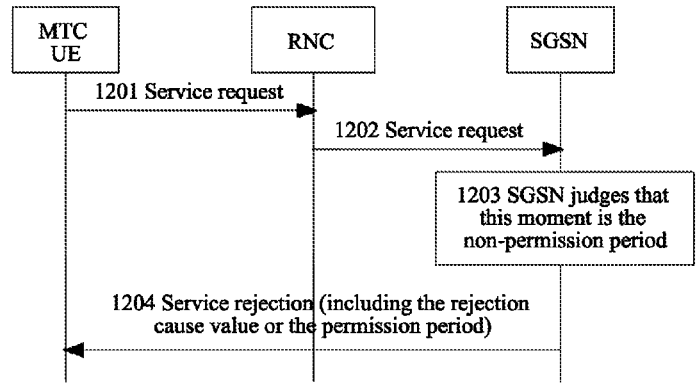
FIG. 12 is a flow chart of an SGSN judging and rejecting a service request according to the obtained permission period according to embodiment 10 of the present invention.

Embodiment 10 is the procedure of the SGSN performing judgment according to the obtained permission period and rejecting the service request. FIG. 12 is the flow chart of the method described by the present invention, and the method comprises the following steps.

In step 1201, the MTC UE sends the service request message to the RNC.

In step 1202, the RNC forwards the service request message to the SGSN.

In step 1203, the SGSN judges that this moment is a non-permission period according to the predefined permission period obtained when the MTC UE is attached before.

In step 1204, the SGSN sends the service rejection message to the MTC UE. The message can include the rejection cause value, which is used for representing that the rejection cause is the MTC UE performing the service request in a non-permission period. The message also can include the predefined permission period. The message also can include the rejection cause value and the predefined permission period at the same time.

Embodiment 11

Figure 13:
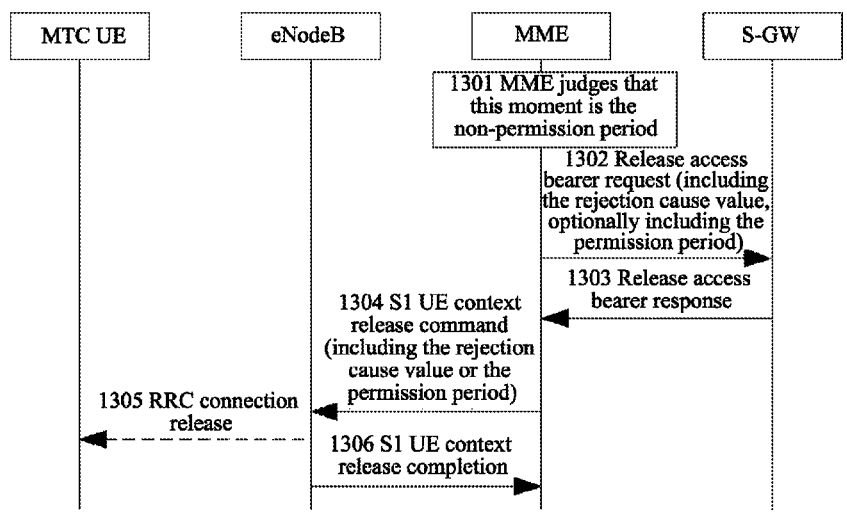
FIG. 13 is a flow chart of an MME performing S1 release and notifying eNodeB of a release cause according to the obtained permission period according to embodiment 11 of the present invention.

Embodiment 11 is the procedure of the MME performing the S1 release according to the obtained permission period and notifying the eNodeB of the release cause. FIG. 13 is the flow chart of the method described by the present invention, and the method comprises the following steps.

In step 1301, the MME needs to perform the S1 release in the non-permission period according to the predefined permission period obtained when the MTC UE is attached before.

In step 1302, the MME sends the release access bearer request message to the S-GW, requiring to release all S1-U bearers of the MTC UE. That request message includes the release cause value, and optionally includes the predefined permission period, used for transmission of the subsequent control data transmission.

In step 1303, the S-GW releases all information of the MTC UE related to the eNodeB and returns the release access bearer response.

In step 1304, the MME sends the S1 UE context release command message to the eNodeB, and the message includes the release cause value, used for representing that the release cause is that the access of the MTC UE is in a non-permission period. That message also optionally includes the predefined permission period.

In step 1305, the eNodeB sends the RRC connection release message to the MTC UE. Once the MTC UE acknowledges that message, the eNodeB deletes the context of the MTC UE.

In step 1306, the eNodeB returns the S1 UE context release completion message to the MME, and at this moment, the signaling connection release between the MME and the eNodeB of that MTC UE is completed.

It needs to be pointed out that the present embodiment is also suited for the case that the MTC UE accesses the SGSN.

Embodiment 12

Figure 14:
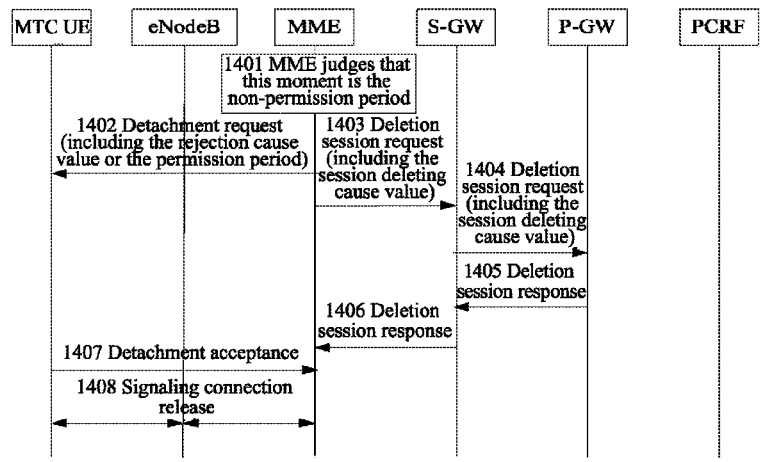
FIG. 14 is a flow chart of an MME performing detachment according to the obtained permission period according to embodiment 12 of the present invention.

Embodiment 12 is the procedure of the MME performing the detachment according to the obtained permission period. FIG. 14 is the flow chart of the method described by the present invention, and the method comprises the following steps.

In step 1401, the MME needs to perform the detachment in the non-permission period according to the predefined permission period obtained when the MTC UE is attached before.

In step 1402, if MTC UE is in the idle state, the MME can perform the implicit detachment; the MME also can page the MTC UE firstly, and then performs the explicit detachment; if the MTC is in the connection state, the MME can perform the explicit detachment, including: the MME sending the detachment request message to the MTC UE, and optionally notifying the MTC UE of the detachment request, used for representing that the cause is that the MTC UE is in a non-permission period.

In step 1403, the MME sends the session deletion request to the S-GW to delete all valid EPS bearers related to the MTC UE. That message includes the session deletion cause value, used for representing that the cause is that the MTC UE is in a non-permission period.

In step 1404, the S-GW sends the session deletion request to the P-GW to delete all valid EPS bearers related to the MTC UE. That message includes the session deletion cause value, used for representing that the cause is that the MTC UE is in a non-permission period.

In step 1405, the P-GW sends the deletion session response message to the S-GW.

In step 1406, the S-GW sends the deletion session response message to the MME.

In step 1407, the MTC UE sends the detachment acceptance message to the MME.

In step 1408, the MME releases the S1-MME signaling connection by sending the S1 Release command to the eNodeB.

It needs to be pointed out that the present embodiment is also suited for the case that the MTC UE accesses the SGSN.

Embodiment 13

Figure 15:
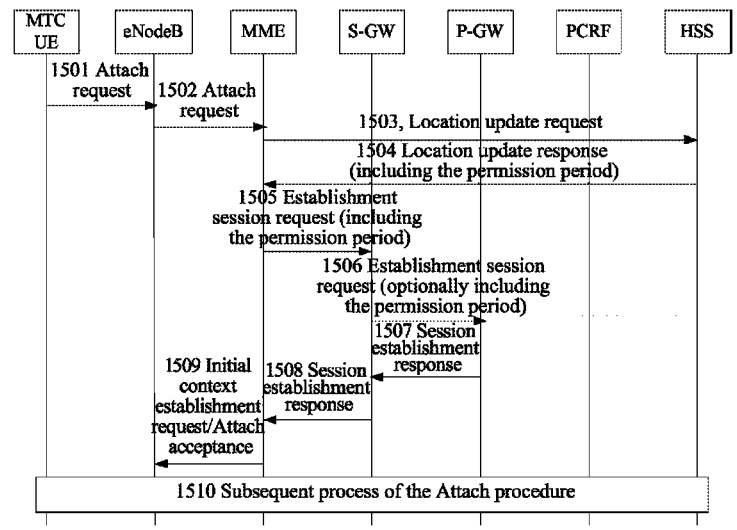
FIG. 15 is a flow chart of an MME obtaining a permission period of an MTC UE during Attach and bringing the permission period to an S-GW and optionally bringing to a P-GW according to embodiment 13 of the present invention.

Embodiment 13 is the procedure of the MME obtaining the permission period of the MTC UE during Attach and sending the permission period through a message to the S-GW, and optionally sending to the P-GW. FIG. 15 is the flow chart of the method described by the present invention, and the method comprises the following steps.

In step 1501, the MTC UE initiates the Attach request message to the eNodeB. When the UE has a GUTI, it needs to include the GUTI; when the UE does not have a GUTI, it needs to include the IMSI.

In step 1502, the eNodeB derives to obtain the MME attached by the UE before according to the GUTI; if the MME is unable to be derived directly, one new MME can be selected through a "MME selection function", and the Attach message is forwarded to the new MME.

In step 1503, if the MME changes or is attached at the first time, the MME will send the location update request message to the HSS.

In step 1504, the HSS sends the location update response message including the predefined permission period to the MME, and the MME stores the above-mentioned permission period.

In step 1505, the MME sends the session establishment request to the S-GW, which includes the permission period, used for the transmission of the subsequent control data.

In step 1506, the MME sends the session establishment request to the P-GW, which optionally includes the permission period, used for the transmission of the subsequent control data.

In step 1507, the P-GW replies the session establishment response to the S-GW.

In step 1508, the S-GW replies the session establishment response to the MME.

In step 1509, the MME sends the initial context establishment request to the eNodeB.

In step 1510, the subsequent procedure of the Attach procedure is completed.

Embodiment 14

Figure 16:
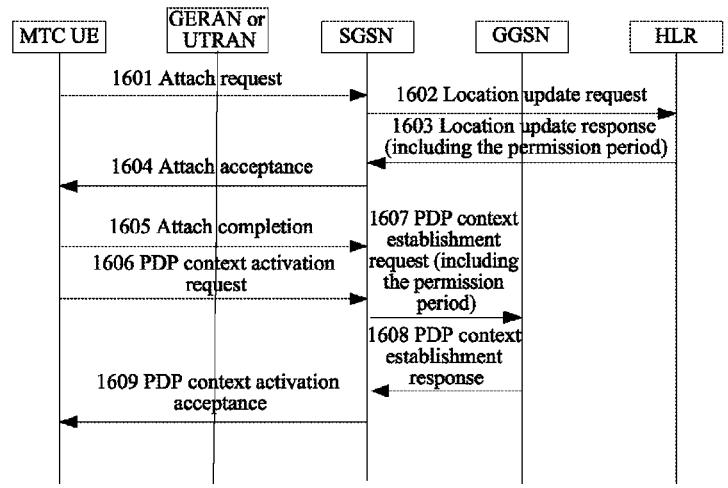
FIG. 16 is a flow chart of an SGSN obtaining a permission period of an MTC UE during Attach and bringing the permission period to a GGSN in the subsequent PDP context activation process according to embodiment 14 of the present invention.

Embodiment 14 is the procedure of the SGSN obtaining the permission period of the MTC UE during Attach and sending the permission period through a message to the GGSN in the subsequent PDP context activation process. FIG. 16 is the flow chart of the method described by the present invention, and the method comprises the following steps.

In step 1601, the MTC UE initiates the Attach request message to the SGSN through the GERAN or the UTRAN wireless network. If the user does not have legal P-TMSI, then the user will take the IMSI; if the user has the legal P-TMSI, then the user should use the P-TMSI and the paired routing area identifier, and if the user has the P-TMSI signature at the same time, it also should be taken.

In step 1602, if the SGSN number changes after the separation since last time, or it is the first Attach of the user, the SGSN should send the location update message to the HLR.

In step 1603, the HLR sends the location update response message including the predefined permission period to the SGSN to acknowledge the location update message of the SGSN, and the SGSN stores the above-mentioned permission period.

In step 1604, the SGSN sends the Attach acceptance message to the MTC UE.

In step 1605, if the P-TMSI or the TMSI changes, the user acknowledges the new assigned TMSI for the SGSN by using the Attach completion message.

In step 1606, when the MTC UE needs to perform data transmission, it initiates the PDP context activation request to the SGSN to establish the transmission channel of the user data; if the MTC UE does not have data to be transmitted, and then the PDP context activation procedure will not be initiated.

In step 1607, the SGSN analyzes the address of the GGSN and establishes one TEID for the requested PDP context, and later sends one establishment PDP context request including the permission period used for the transmission of the subsequent control data to the GGSN.

In step 1608, the GGSN returns the PDP context establishment response.

In step 1609, the SGSN stores the GGSN information, and sends the PDP context activation acceptance message to the MTC UE.

Embodiment 15

Figure 17:
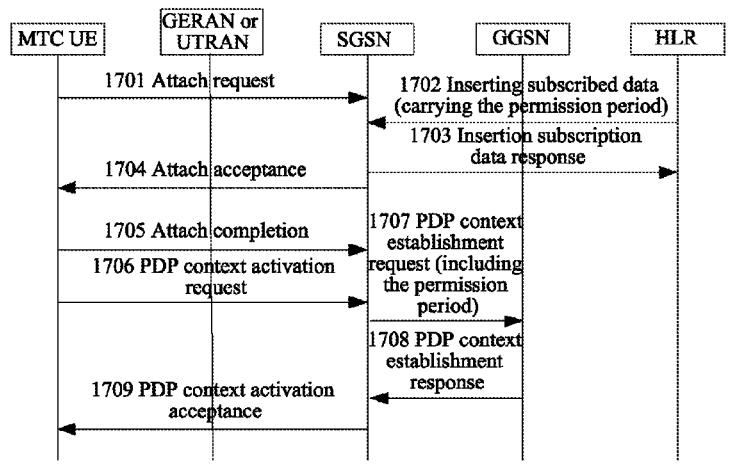
FIG. 17 is a flow chart of an SGSN obtaining a permission period of an MTC UE during Attach and bringing the permission period to a GGSN in the subsequent PDP context activation process according to embodiment 15 of the present invention.

Embodiment 15 is the procedure of the SGSN obtaining the permission period of the MTC UE during Attach and sending the permission period through a message to the GGSN in the subsequent PDP context activation process. FIG. 17 is the flow chart of the method described by the present invention, and the method comprises the following steps.

In step 1701, the MTC UE initiates the Attach request message to the SGSN through the GERAN or the UTRAN wireless network. If the user does not have legal P-TMSI, then the user will take the IMSI; if the user has the legal P-TMSI, then the user should use the P-TMSI and the paired routing area identifier, and if the user has the P-TMSI signature at the same time, it also should be taken.

In step 1702, if the SGSN number changes after the separation since last time, or it is the first Attach of the user, the SGSN should send the location update message to the HLR, and the HLR further sends the insertion subscription data message including the predefined permission period to the SGSN, and the SGSN stores the above-mentioned permission period.

In step 1703, the SGSN sends the insertion subscription data response message to the HLR.

In step 1704, the SGSN sends the Attach acceptance message to the MTC UE.

In step 1705, if the P-TMSI or the TMSI changes, the user acknowledges the new assigned TMSI for the SGSN by using the Attach completion message.

In step 1706, when the MTC UE needs to perform data transmission, it initiates the PDP context activation request to the SGSN to establish the transmission channel of the user data; if the MTC UE does not have data to be transmitted, and then the PDP context activation procedure will not be initiated.

In step 1707, the SGSN analyzes the address of the GGSN and establishes one TEID for the requested PDP context, and later sends one establishment PDP context request including the permission period used for the transmission of the subsequent control data to the GGSN.

In step 1708, the GGSN returns the PDP context establishment response.

In step 1709, the SGSN stores the GGSN information, and sends the PDP context activation acceptance message to the MTC UE.

Embodiment 16

Figure 18:
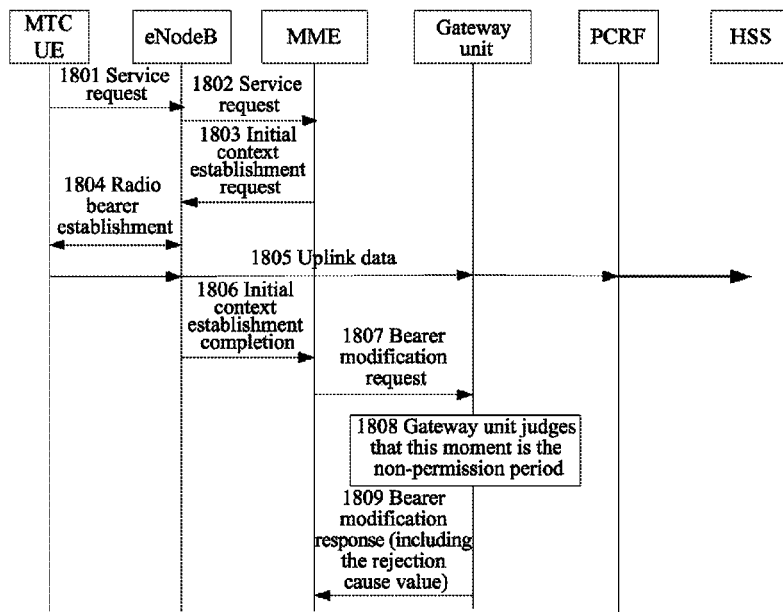
FIG. 18 is a flow chart of a gateway unit rejecting uplink data transmission according to the obtained permission period according to embodiment 16 of the present invention.

Embodiment 16 is the procedure of the gateway unit rejecting the uplink data transmission according to the obtained permission period. FIG. 18 is the flow chart of the method described by the present invention, and the method comprises the following steps.

In step 1801, the MTC UE sends the service request message to the eNodeB.

In step 1802, the eNodeB forwards the service request message to the MME.

In step 1803, the MME sends the initial context establishment request to the eNodeB to activate the radio and S1 bearers of all EPS bearers.

In step 1804, the radio bearer is established between the MTC UE and the eNodeB.

In step 1805, the uplink data of the MTC UE is forwarded to the gateway unit through the eNodeB.

In step 1806, the eNodeB sends the initial context establishment completion message to the MME.

In step 1807, the MME sends the bearer modification request message to the gateway unit.

In step 1808, the gateway unit judges that this moment is a non-permission period according to the predefined permission period obtained when the MTC UE is attached before.

In step 1809, the gateway unit sends the bearer modification response message to the MME, and that message includes the bearer modification failure cause value, used for controlling the behavior to the MTC UE by the MME subsequently, including that: the MME can initiate the detachment procedure to let the MTC UE return to the unregistered state according to different cause values; and the MME also can initiate the S1 Release procedure to let the MTC UE return to the idle state.

The gateway unit in the above-mentioned step is: the S-GW or the P-GW.

It needs to be pointed out that the present embodiment is also suited for the case that the UE accesses the SGSN.

Embodiment 17

Figure 19:
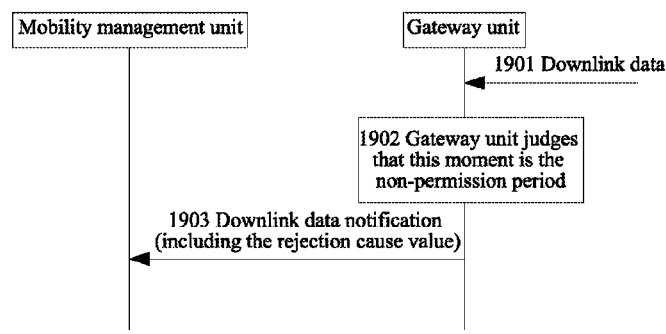
FIG. 19 is a flow chart of a gateway unit rejecting downlink data transmission according to the obtained permission period according to embodiment 17 of the present invention.

Embodiment 17 is the procedure of the gateway unit rejecting the downlink data transmission according to the obtained permission period. FIG. 19 is the flow chart of the method described by the present invention, and the method comprises the following steps.

In step 1901, there are downlink data reaching the gateway unit.

In step 1902, the gateway unit judges that this moment is a non-permission period according to the predefined permission period obtained when the MTC UE is attached before.

In step 1903, the gateway unit sends the downlink data message to the MME, and that message includes the rejection data transmission cause value, used for controlling the behavior to the MTC UE by the MME subsequently, including that: the MME can initiate the detachment procedure to let the MTC UE return to the unregistered state according to different cause values; and the MME also can initiate the S1 Release flow to let the MTC UE return to the idle state.

The gateway unit in the above-mentioned step is: the S-GW or the P-GW.

It needs to be pointed out that the present embodiment is also suited for the case that the UE accesses the SGSN.

Obviously, it can be understood by those skilled in the art that each module or each step above-mentioned in the present invention can be implemented by the universal computing apparatus, and they can be integrated in a single computing apparatus, or distributed in the network made up by a plurality of computing apparatuses. Alternatively, they can be implemented by the executable program codes of the computing apparatus. Accordingly, they can be stored in the storage apparatus and implemented by the computing apparatus, or they are made into each integrated circuit module respectively, or a plurality of modules or steps therein are made into the single integrated circuit module to be implemented. Thus, the present invention is not limited to any specific form of the combination of the hardware and software.

The above description is only the preferred embodiments of the present invention and is not intended to limit the present invention. For those skilled in the art, the present invention can have various modifications and variations. All of modifications, equivalent substitutions and/or variations without departing from the spirit and essence of the present invention should be embodied in the protection scope of the appending claims of the present invention.

INDUSTRIAL APPLICABILITY

Compared with the related art, the present invention provides a method, mobility management unit and gateway unit for restricting a MTC device to access the network and communicate in a non-permission period, which can ensure the MTC device only communicate in the permission period and restrict the MTC device to access the network or communicate in the non-permission period according to the requirement of the operator.

What is claimed is:

1. A method for restricting access and communication of a machine type communication (MTC) device, comprising:
    a mobility management unit judging whether an access request or a service request of a MTC device is currently in a permission period of time according to the permission period of time of the MTC device;
    when judging that the access request or the service request is not in the permission period of time, rejecting the access request or the service request of the MTC device and notifying the MTC device of a rejection cause and/or the permission period of time at a meantime; and
    when the MTC device performs an Attach procedure, a tracking area update procedure or a routing area update procedure, the mobility management unit obtaining the permission period of time from a subscriber server through one of following messages: a location update response message and an insertion subscription data message;
    wherein the mobility management unit is a mobility management entity (MME) or a serving general packet radio service (GPRS) support node.

2. The method according to claim 1, wherein the subscriber server is a home subscriber server (HSS) or a home location register (HLR).

3. The method according to claim 1, wherein the access request refers to: an Attach request, a tracking area update request, a packet data protocol (PDP) context activation request or a routing area update request.

4. The method according to claim 1, further comprising:
    the mobility management unit releasing an air interface of the MTC device in a non-permission period of time according to the permission period of time, and notifying a serving gateway and an evolved node B of a release cause value and/or the permission period of time, or, notifying a gateway general packet radio service (GPRS) support node and a radio network controller; and/or,
    the mobility management unit performing detachment and deleting a session of the MTC device in the non-permission period of time according to the permission period of time, notifying the serving gateway and a packet data network gateway and the MTC device of the session deletion cause value and/or the permission period of time, or notifying the gateway GPRS support node and the MTC device.

5. A method for restricting access and communication of a machine type communication (MTC) device, comprising:
    a gateway unit obtaining a permission period of time of a MTC device from a mobility management unit;
    the gateway unit judging whether data transmission of the MTC device is currently in the permission period of time according to the obtained permission period of time;
    when judging that the data transmission is not in the permission period of time, rejecting the data transmission of the MTC device;
    the mobility management unit obtaining the permission period of time of the MTC device from a subscriber server when the MTC device performs an Attach procedure, a tracking area update procedure or a routing area update procedure; and
    the gateway unit sending a rejection cause value to the mobility management unit when rejecting the data transmission of the MTC device;
    wherein the gateway unit is a gateway general packet radio service (GPRS) support node, a serving gateway or a packet data network gateway; and
    wherein the mobility management unit is a mobility management entity (MME) or a serving GPRS support node.

6. The method according to claim 5, wherein
    when the gateway unit is the gateway GPRS support node, the step of the gateway unit obtaining the permission period of time of the MTC device from the mobility management unit comprises: the gateway GPRS support node obtaining the permission period of time from the mobility management unit through a packet data protocol (PDP) context establishment request message or a PDP context update request message when the MTC device performs a PDP context activation procedure or a routing area update procedure; or,
    when the gateway unit is the serving gateway or the packet data network gateway, the step of the gateway unit obtaining the permission period of time of the MTC device from the mobility management unit comprises: the serving gateway or the packet data network gateway obtaining the permission period of time from the mobility management unit through a session establishment request message or a bearer modification request message when the MTC device performs an Attach procedure or a tracking area update procedure.

* * * * *